United States Patent

Caulk

[11] Patent Number: 5,678,970
[45] Date of Patent: Oct. 21, 1997

[54] SELF-COINING FASTENER

[75] Inventor: Gary D. Caulk, Indianapolis, Ind.

[73] Assignee: Hahn Systems, Indianapolis, Ind.

[21] Appl. No.: 641,818

[22] Filed: May 2, 1996

[51] Int. Cl.[6] .............. F16B 19/04; F16B 19/06; B23P 11/00
[52] U.S. Cl. .............. 411/504; 411/500; 411/179; 29/432.2
[58] Field of Search .............. 411/177, 179, 411/180, 500, 501, 504; 29/432.2, 515, 525.06

[56] References Cited

U.S. PATENT DOCUMENTS

| | | | |
|---|---|---|---|
| 3,276,499 | 10/1966 | Reusser | 411/179 |
| 3,909,913 | 10/1975 | Tildesley | 29/432 |
| 4,130,922 | 12/1978 | Koett | 29/243.53 |
| 4,757,596 | 7/1988 | Herb | 29/432.2 |
| 4,978,270 | 12/1990 | Ackerman | 411/511 |
| 5,528,812 | 6/1996 | Muller | 29/432.2 |

*Primary Examiner*—Neill R. Wilson
*Attorney, Agent, or Firm*—Woodard, Emhardt, Naughton, Moriarty & McNett

[57] ABSTRACT

A self-coining fastener which may be used to join at least two sheets of metal together without leaving a coining mark on one side thereof. The present self-coining fastener therefore produces an entirely flush surface on one side of the joined layers. The fastener comprises a top surface and a bottom surface, the top surface having a larger diameter than the bottom surface. A groove is formed around a perimeter of the fastener in order to transition between the two diameter surfaces. Because the top surface of the fastener has a larger diameter, no coining ring is required in the upper die which installs the fastener. The larger diameter head acts as a self-coining manner to push the metal in the joined layers into the central groove. The result is an installed fastener in which the larger diameter top surface is entirely flush with the top surface of the joined metals, without the presence of a coining mark.

18 Claims, 3 Drawing Sheets

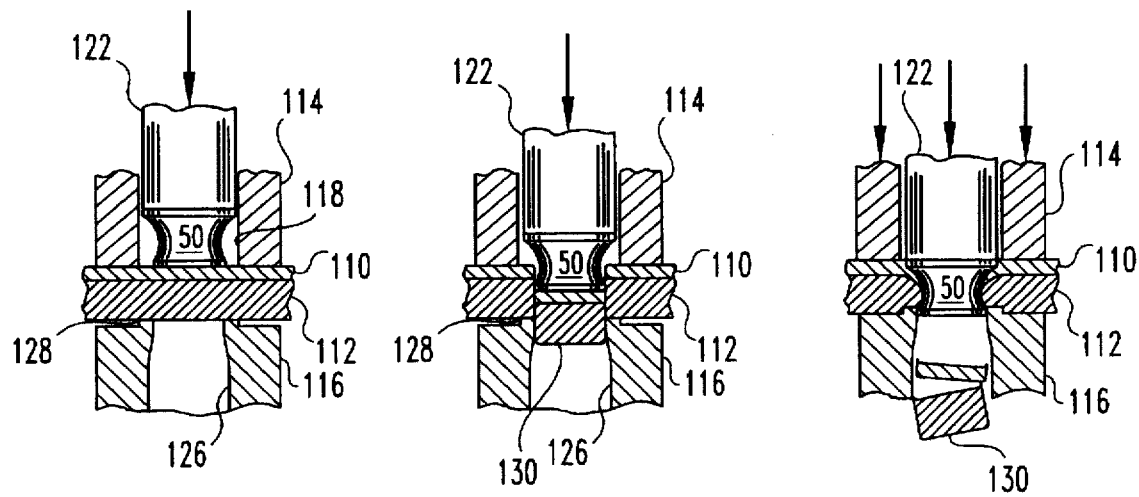
Fig. 4a  Fig. 4b  Fig. 4c
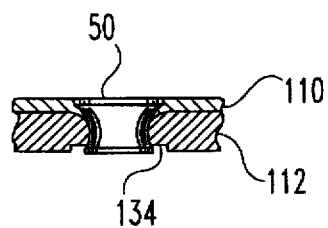
Fig. 5
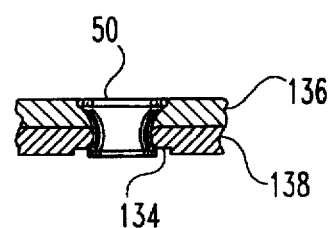
Fig. 6

SELF-COINING FASTENER

TECHNICAL FIELD OF THE INVENTION

The present invention generally relates to fasteners for joining sheets of material together and, more particularly, to a self-coining fastener which does not require a coining ring on the top installation die.

BACKGROUND OF THE INVENTION

There are numerous fasteners known in the prior art which are effective in joining together two or more articles, particularly sheet metal. For example, spot welding is a relatively quick way of joining two or more sheets of metal together, however it is expensive. Furthermore, if the articles are to be plated, painted or otherwise surface finished, such spot welding must be carried out at a relatively early stage in manufacture due to the heat generated by the spot welding operation. Such heat tends to scar the surface finish. An alternative to spot welding is the use of rivets, however this requires that the articles being joined be pierced (e.g. by drilling), the holes aligned, the rivet inserted through the holes, and then some system employed for expanding the rivet internally or peening over its free end. The sheer number of separate operations involved in the riveting process tends to make it slower and hence also expensive.

Another method of joining sheets of material together is the use of a so-called headless rivet, as illustrated in FIGS. 1A–C. The two sheets 10, 12 to be joined together are placed between an upper die 14 and a lower die 16. The upper die 14 includes a central shaft 18 which receives the fastener 20 and in which reciprocates a punch 22. The upper die 14 further includes a raised coining ring 24 surrounding the perimeter of the shaft 18. Likewise, the lower die 16 includes an internal shaft 26 and a raised coining ring 28 surrounding the perimeter of the shaft 26. FIG. 1A illustrates the positioning of the various elements at the start of the fastening process.

As illustrated in FIG. 1B, the fastening process begins by driving the plunger 22 toward the sheets 10, 12 such that the fastener 20 is forced through the sheets 10, 12 by shearing off the slugs 30. The shaft 26 formed in the lower die 16 allows the slugs 30 to be pushed out of the sheets 10, 12. As illustrated in FIG. 1C, the plunger 22 reaches its lower most extension when it is flush with the top surface of the top sheet 10. Simultaneously, the upper die 14 is moved in a downward direction such that the sheets 10, 12 are compressed between the upper die 14 and the lower die 16. This motion causes the coining ring 24 to be forced into the surface of the sheet 10 and the coining ring 28 be forced into the surface of the sheet 12. Intrusion of the coining rings 24, 28 into the sheets 10, 12 causes deformation of the metal in this area, which forces the metal into the concave groove formed around the perimeter of the fastener 20. By deforming the metal into this groove, the fastener 20 is securely retained by the sheets 10, 12, thereby fastening them together.

The retained fastener 20 is illustrated in FIG. 2. Although the top and bottom of the fastener 20 are flush with the top and bottom surface of the sheets 10, 12, action of the coining ring 24 leaves a coining mark 32 in the surface of the top sheet 10, while action of the coining ting 28 leaves a coining mark 34 in the surface of the bottom sheet 12. This is aesthetically undesirable in situations where a flush, continuous surface is required on the side of the fastener which will ultimately be visible to the consumer. FIG. 3 illustrates the similar installation of the fastener 20 through sheets 36, 38 which have approximately the same thickness. There is therefore a need for a fastener which may be used to join at least two sheets of material together, but which does not incorporate a coining mark around the fastener on at least one side. The present invention is directed toward meeting this need.

SUMMARY OF THE INVENTION

The present invention relates to a self-coining fastener. The fastener may be used to join at least two sheets of metal together without leaving a coining mark on one side thereof. The present self-coining fastener therefore produces an entirely flush surface on one side of the joined layers. The fastener comprises a top surface and a bottom surface, the top surface having a larger diameter than the bottom surface. A groove is formed around a perimeter of the fastener in order to transition between the two surface diameters. Because the top surface of the fastener has a larger diameter, no coining ring is required in the upper die which installs the fastener. The larger diameter head acts as a self-coining manner to push the metal in the joined layers into the central groove. The result is an installed fastener in which the larger diameter top surface is entirely flush with the top surface of the joined metals, without the presence of a coining mark.

In one form of the invention, a self-coining fastener is disclosed, comprising a substantially flat bottom end having a bottom surface area; a substantially flat top end having a top surface area that is greater than the bottom surface area; and a circumferential groove extending between the top end and the bottom end; wherein the circumferential groove does not include more than one section of positive slope.

In another form of the invention, a self-coining fastener system for fastening a plurality of sheets is disclosed, comprising a self-coining fastener of a longitudinal length substantially equal to a sum of the thicknesses of materials to be fastened together, the fastener comprising: a substantially flat bottom end having a bottom surface area; a substantially flat top end having a top surface area that is greater than the bottom surface area; a circumferential groove extending between the top end and the bottom end; wherein the circumferential groove does not include more than one section of positive slope; a bottom die having an opening therethrough of substantially the same size and shape as the bottom end of the fastener and a coining ring surrounding the opening at an edge thereof; a top die having at least one flat surface operative to force the fastener and a portion of said plurality of sheets toward the bottom die.

In another form of the invention, a method of joining a plurality of sheets is disclosed, comprising the steps of: (a) supporting the sheets on a bottom die having an opening therethrough and a coining ring surrounding the opening at an edge thereof; (b) pressing into the sheets, in alignment with the opening, a self-coining fastener comprising: a substantially flat bottom end having a bottom surface area; a substantially flat top end having a top surface area that is greater than the bottom surface area; a circumferential groove extending between the top end and the bottom end; wherein the circumferential groove does not include more than one section of positive slope; (c) continuing step (b) until the top end is flush with a top surface of the sheets.

BRIEF DESCRIPTION OF THE DRAWINGS

FIGS. 4A–C are side cross-sectional views of a first embodiment method for installing a fastener of the present invention.

FIG. 5 is a side cross-sectional view of a fastener of the present invention installed through two sheets of material having different thicknesses.

FIG. 6 is a side cross-sectional view of the fastener of the present invention installed through two sheets of material having equivalent thicknesses.

DESCRIPTION OF THE PREFERRED EMBODIMENTS

Figure 1A:
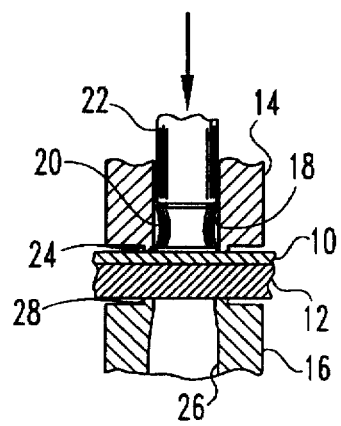
FIG. 1A–C are side cross-sectional views illustrating steps in a prior art fastener installation process.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The self-coining fastener of the present invention does not require a coining ring on the upper installation die. This is due to the fact that the fastener of the present invention includes an upper surface which has a greater diameter than the lower surface. As a result, this larger upper surface act to force metal in the layers being joined into the central groove of the fastener, thereby eliminating the need for the top coining ring. As a result, the upper surface of the fastener is completely flush with the surface of the materials being joined, without the presence of a coining mark around the periphery of the fastener.

Figure 8:
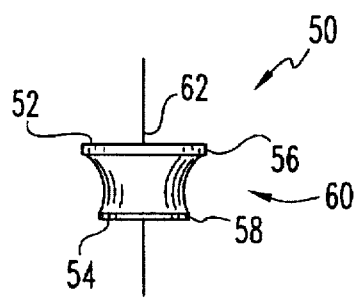
FIG. 8 is a side elevational view of a first embodiment fastener of the present invention.

A first preferred embodiment of the self-coining fastener of the present invention is illustrated in a side elevational view if FIG. 8, and indicated generally at 50. The fastener 50 has a top surface 52 and a bottom surface 54. The top surface 52 is illustrated having a thickness 56 and the bottom surface 54 is illustrated having a thickness 58, however such thicknesses are optional and the present invention comprehends a fastener in which the thicknesses 56 and 58 are zero. The upper surface 52 is formed to have a larger diameter than the bottom surface 54. This larger surface provides the self-coining feature of the present invention, as explained in greater detail hereinbelow. The fastener 50 illustrated in FIG. 8 is of a circular cross-sectional configuration, however the present invention comprehends fasteners formed in any geometric cross-sectional shape, such as squares or rectangles, the teachings of the present invention being applicable to any such shape.

Coupling the top surface 52 and the bottom surface 54 is a groove 60 which circumferentially surrounds the fastener 50. In describing the various shapes of the groove 60 which comprise the present invention, it is necessary to define surfaces with respect to the longitudinal axis 62 of the fastener 50. Therefore, when following the contour of groove 60 from the upper surface 52 to the lower surface 54, any portion of the groove 60 which slants toward the longitudinal axis 62 (when moving in this direction) is said to have positive slope. Likewise, any portion of the groove 60 which slants away from the longitudinal axis 62 (again, when moving from top to bottom) is said to have negative slope. Finally, any portion of the groove 60 which is parallel to the longitudinal axis 62 is said to have zero slope.

Using the first preferred embodiment fastener 50 as an example, if the shape of the groove 60 is examined, moving from the top surface 52 to the bottom surface 54, it is seen that the surface of the groove 60 initially slants toward the longitudinal axis 62, therefore this portion of the groove 60 is said to have positive slope. Positive slope is maintained in the groove 60 until approximately midway between the upper surface 52 and the lower surface 54, at which point the groove begins to slant away from the longitudinal axis 62, thereby exhibiting negative slope. The surface of the groove 60 switches from positive slope to negative slope with only an infinitesimally small section of zero slope therebetween. This is the case for any concave groove 60 which exhibits a constant radius or a slowly varying radius.

Figure 9:
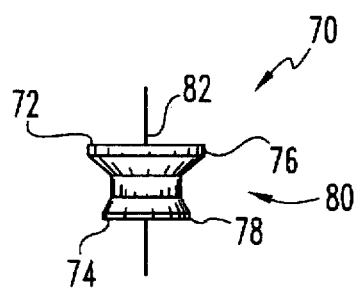
FIG. 9 is a side elevational view of a second embodiment fastener of the present invention.

A second embodiment fastener of the present invention is illustrated in a side elevational view in FIG. 9, and indicated generally at 70. Like the fastener 50, the fastener 70 has an upper surface 72 which has a greater diameter than its lower surface 74. Although the upper surface 72 is illustrated as having a thickness 76 and the lower surface 74 is illustrated having a thickness 78, the present invention comprehends a fastener in which the thicknesses 76 and 78 are substantially zero. Coupling the upper surface 72 and the lower surface 74 is a groove 80 which circumferentially surrounds the fastener 70. Moving from the upper surface 72 toward the lower surface 74, the groove 80 may be described with reference to the longitudinal axis 82 as exhibiting a section of positive slope, then a section of zero slope and then a section of negative slope. Both the fasteners 50 and 70 operate in substantially the same manner, therefore installation of a fastener of the present invention is described hereinbelow with reference to the fastener 50. An analogous installation method is used for installation of the fastener 70 or for any other fastener in the class covered by the present invention.

Figure 1B:
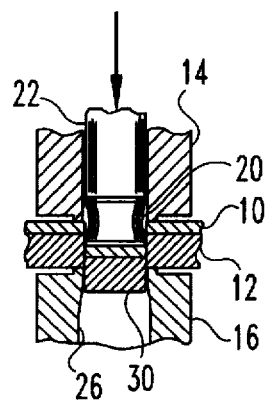
Figure 1C:
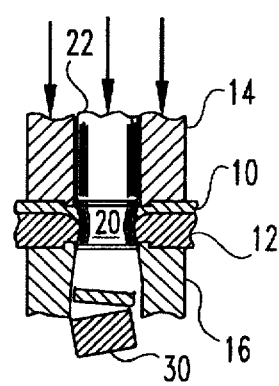
Figure 2:
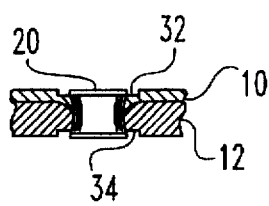
FIG. 2 is a side cross-sectional view of a prior art fastener installed through two sheets of material having different thicknesses.
Figure 3:
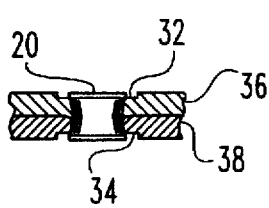
FIG. 3 is a side cross-sectional view of a prior art fastener installed through two sheets of material having equivalent thicknesses.

Referring to FIGS. 4A–C, sheets 110 and 112 are placed on top of one another and held between an upper die 114 and a lower die 116. The lower die 116 is substantially identical to the lower die 16 of FIG. 1, including the central shaft 126 and the raised coining ring 128. However, the upper die 114 is substantially different than the upper die 14 of FIG. 1. The central shaft 118 of the upper die 114 is substantially larger than the central shaft 18 of the die 14 in order to accommodate the larger diameter of the upper surface 52 of the fastener 50. Furthermore, there is no coining ring associated with the lower surface of the upper die 114, therefore the upper die 114 sits flush against the sheet 110. In a preferred embodiment, the diameter of the upper surface 52 of the fastener 50 is substantially equal to the outside diameter of the coining ring 128. A plunger 122 is provided within the channel 118 and is operative to reciprocate therein.

Referring now to FIG. 4B, the plunger 122 is moved in a downward motion, thereby causing the lower surface of the fastener 50 to shear through the sheets 110, 112, thereby creating the slugs 130. As illustrated in FIG. 4C, as the plunger 122 nears the bottom of its range of motion, the upper die 114 is pressed against the sheets 110, 112, thereby compressing them against the lower die 116. The lowest extent of the plunger 122 is substantially flush with the upper surface of the sheet 110. As the sheets 110, 112 are compressed against the lower die 116, the coining ring 128 is forced into the lower sheet 112, thereby compressing metal into the groove 60 of the fastener 50. At the same time, the plunger 122 pushes the upper surface of the fastener 50 into the upper sheet 110, wherein the larger surface area of the upper surface of the fastener 50 performs the same function as the upper coining ring 24 of FIG. 1, compressing the metal in the sheets 110, 112 into the groove 60.

The installed connector 50 is illustrated in cross-sectional view in FIG. 5. The finished fastener joint still exhibits a bottom coining mark 134 around the periphery of the fastener 50, however no such coining mark is present in the upper surface thereof. This is because the coining action on the upper surface is provided by the "head" formed by the larger diameter upper surface 52. The sheets illustrated in FIG. 5 are of disparate thicknesses, however the result is the same when sheets 136, 138 of substantially equal thickness are joined by the fastener 50, as illustrated in FIG. 6.

Figure 7A:
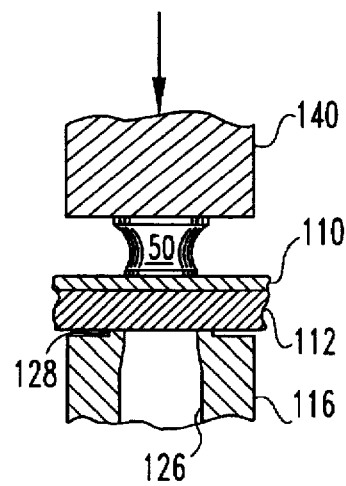
FIG. 7A–C are side cross-sectional views illustrating a second embodiment method for installing the fastener of the present invention.
Figure 7B:
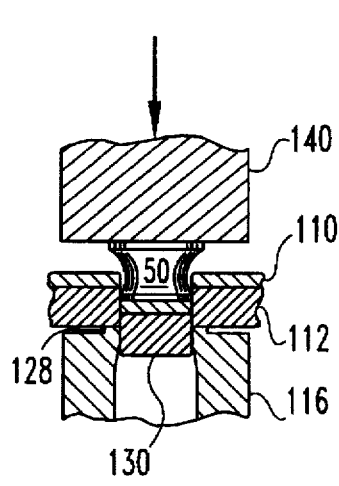
Figure 7C:
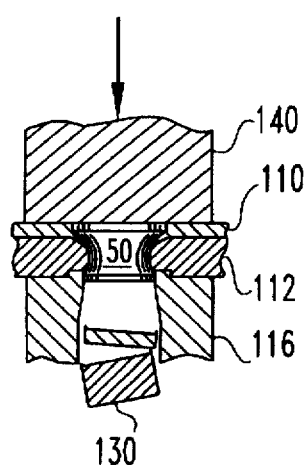

A second embodiment installation method is illustrated in FIGS. 7A–C. As shown in FIG. 7A, the upper die 114/plunger 122 combination is replaced by a single plunger 140. Otherwise, the method and apparatus used is identical to that of FIGS. 4A–C. As shown in FIG. 7B, initial downward motion of plunger 140 causes the fastener 50 to shear the slugs 130 from the sheets 110, 112. When the plunger 140 contacts the upper surface of the sheet 110, further downward motion acts to compress the sheets 110, 112 between the plunger 140 and the lower die 116. This drives the head of the fastener 50, and the coining ring 128, into the sheets 110, 112, thereby forcing metal into the groove 60 of the fastener 50 and completing the coupling. Both the head of the fastener 50 and the coining ring 128 operate to force metal into the groove 60.

The fastener of the present invention exhibits several improvements over similar prior art fasteners. For example, the "head" of the fastener of the present invention has a larger circumference, giving greater pull-out strength of the top material 110. This is especially beneficial when the top material 110 is thinner than the bottom material 112, giving greater holding power to the thinner section and maximizing the pull out and peel strength of the fastened joint. Empirical tests have demonstrated a seven fold improvement in peel strength when using the fastener 50 as compared to the prior art fastener 20. Secondly, the area under the "head" produces the upper coining of the fastener, eliminating the upper coining mark 32 which is not only aesthetically displeasing, but in which debris and corrosive material may be trapped. Thirdly, the life of the upper die is greatly increased by not requiring a coining ring. The upper die 114/122 or 140 of the present invention will likely never need replacement, whereas the upper die 14 with the coining ring 24 of the prior art will last for only 10,000–50,000 impressions. Fourthly, the absence of the upper coining ring protects the plating or finish on the upper material 110 by removing the sharp edges of the coining ring which can break or mar the finish. Finally, the larger diameter of the "head" will not allow the fastener of the present invention to shoot through the punched hole when piercing material with high tensile strengths. High tensile strength material builds potential energy which is converted into kinetic energy. Without the increased diameter "head" of the present invention fastener, it is possible for the fastener to shoot completely through the hole.

In a preferred embodiment, the fasteners of the present invention are formed with an upper surface diameter to lower surface diameter ratio of 4:3. However, it will be appreciated by those skilled in the art that ratios other than the preferred ratio will also be functional, and the present invention encompasses other such ratios. The fasteners of the present invention may be made from any suitable material, such as steel, stainless steel, or aluminum. The fasteners of the present invention may be made from any convenient manufacturing process, such as roll forming or by use of a screw machine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A self-coining fastener, comprising:
   a substantially flat bottom end having a bottom surface area;
   a substantially flat top end having a top surface area that is greater than the bottom surface area; and
   a circumferential groove extending between the top end and the bottom end;
   wherein the circumferential groove does not include more than one section of positive slope; and
   wherein the bottom end and the top end are substantially circular.

2. The self-coining fastener of claim 1, wherein a ratio of the top surface area to the bottom surface area is 4:3.

3. The self-coining fastener of claim 1, wherein the bottom end and the top end have substantially no thickness.

4. The self-coining fastener of claim 1, wherein the circumferential groove, from the top end to the bottom end, exhibits positive slope transitioning to zero slope transitioning to negative slope.

5. The self-coining fastener of claim 1, wherein the top end is operative to force metal into the circumferential groove when the fastener is installed through a plurality of metal layers.

6. A self-coining fastener system for fastening a plurality of sheets, comprising:
   a self-coining fastener of a longitudinal length substantially equal to a sum of the thicknesses of materials to be fastened together, the fastener comprising:
   a substantially flat bottom end having a bottom surface area;
   a substantially flat top end having a top surface area that is greater than the bottom surface area;
   a circumferential groove extending between the top end and the bottom end;
   wherein the circumferential groove does not include more than one section of positive slope;
   a bottom die having an opening therethrough of substantially the same size and shape as the bottom end of the fastener and a coining ring surrounding the opening at an edge thereof;
   a top die having at least one flat surface operative to force the fastener and a portion of said plurality of sheets toward the bottom die;
   wherein the bottom end and the top end are substantially circular.

7. The self-coining fastener of claim 6, wherein a ratio of the top surface area to the bottom surface area is 4:3.

8. The self-coining fastener of claim 6, wherein the bottom end and the top end have substantially no thickness.

9. The self-coining fastener of claim 6, wherein the circumferential groove, from the top end to the bottom end, exhibits positive slope transitioning to zero slope transitioning to negative slope.

10. The self-coining fastener of claim 6, wherein the top end is operative to force metal into the circumferential groove when the fastener is installed through a plurality of metal layers.

11. A self-coining fastener, comprising:
- a substantially flat bottom end having a bottom surface area;
- a substantially flat top end having a top surface area that is greater than the bottom surface area; and
- a circumferential groove extending between the top end and the bottom end;
- wherein the circumferential groove, from the top end to the bottom end, exhibits positive slope transitioning to zero slope transitioning to negative slope; and
- wherein the circumferential groove exhibits no slope discontinuities when transitioning from positive slope to zero slope and when transitioning from zero slope to negative slope.

12. A self-coining fastener system for fastening a plurality of sheets, comprising:
- a self-coining fastener of a longitudinal length substantially equal to a sum of the thicknesses of materials to be fastened together, the fastener comprising:
  - a substantially flat bottom end having a bottom surface area;
  - a substantially flat top end having a top surface area that is greater than the bottom surface area;
  - a circumferential groove extending between the top end and the bottom end;
  - wherein the circumferential groove, from the top end to the bottom end, exhibits positive slope transitioning to zero slope transitioning to negative slope; and
  - wherein the circumferential groove exhibits no slope discontinuities when transitioning from positive slope to zero slope and when transitioning from zero slope to negative slope;
- a bottom die having an opening therethrough of substantially the same size and shape as the bottom end of the fastener and a coining ring surrounding the opening at an edge thereof;
- a top die having at least one flat surface operative to force the fastener and a portion of said plurality of sheets toward the bottom die.

13. A method of joining a plurality of sheets, comprising the steps of:
(a) supporting the sheets on a bottom die having an opening therethrough and a coining ring surrounding the opening at an edge thereof;
(b) pressing into the sheets, in alignment with the opening, a self-coining fastener comprising:
- a substantially flat bottom end having a bottom surface area;
- a substantially flat top end having a top surface area that is greater than the bottom surface area;
- a circumferential groove extending between the top end and the bottom end;
- wherein the circumferential groove does not include more than one section of positive slope; and
- wherein the bottom end and the top end are substantially circular;

(c) continuing step (b) until the top end is flush with a top surface of the sheets.

14. The self-coining fastener method of claim 13, wherein a ratio of the top surface area to the bottom surface area is 4:3.

15. The self-coining fastener method of claim 13, wherein the bottom end and the top end have substantially no thickness.

16. The self-coining fastener method of claim 13, wherein the circumferential groove, from the top end to the bottom end, exhibits positive slope transitioning to zero slope transitioning to negative slope.

17. The self-coining fastener method of claim 13, wherein the top end is operative to force metal into the circumferential groove when the fastener is installed through a plurality of metal layers.

18. A method of joining a plurality of sheets, comprising the steps of:
(a) supporting the sheets on a bottom die having an opening therethrough and a coining ring surrounding the opening at an edge thereof;
(b) pressing into the sheets, in alignment with the opening, a self-coining fastener comprising:
- a substantially flat bottom end having a bottom surface area;
- a substantially flat top end having a top surface area that is greater than the bottom surface area;
- a circumferential groove extending between the top end and the bottom end;
- wherein the circumferential groove, from the top end to the bottom end, exhibits positive slope transitioning to zero slope transitioning to negative slope; and
- wherein the circumferential groove exhibits no slope discontinuities when transitioning from positive slope to zero slope and when transitioning from zero slope to negative slope;

(c) continuing step (b) until the top end is flush with a top surface of the sheets.

* * * * *

UNITED STATES PATENT AND TRADEMARK OFFICE
CERTIFICATE OF CORRECTION

PATENT NO : 5,678,970
DATED : October 21, 1997
INVENTOR(S) : Gary D. CAULK

It is certified that error appears in the above-identified patent and that said Letters Patent are hereby corrected as shown below:

In column 1, line 62, "ting" should be --ring--.

Signed and Sealed this

Fourteenth Day of December, 1999

Q. TODD DICKINSON

*Attest:*

*Attesting Officer*     *Acting Commissioner of Patents and Trademarks*